March 16, 1965   J. C. McGUIRE ETAL   3,173,648
FLOW CONTROL DEVICES
Filed Aug. 14, 1961
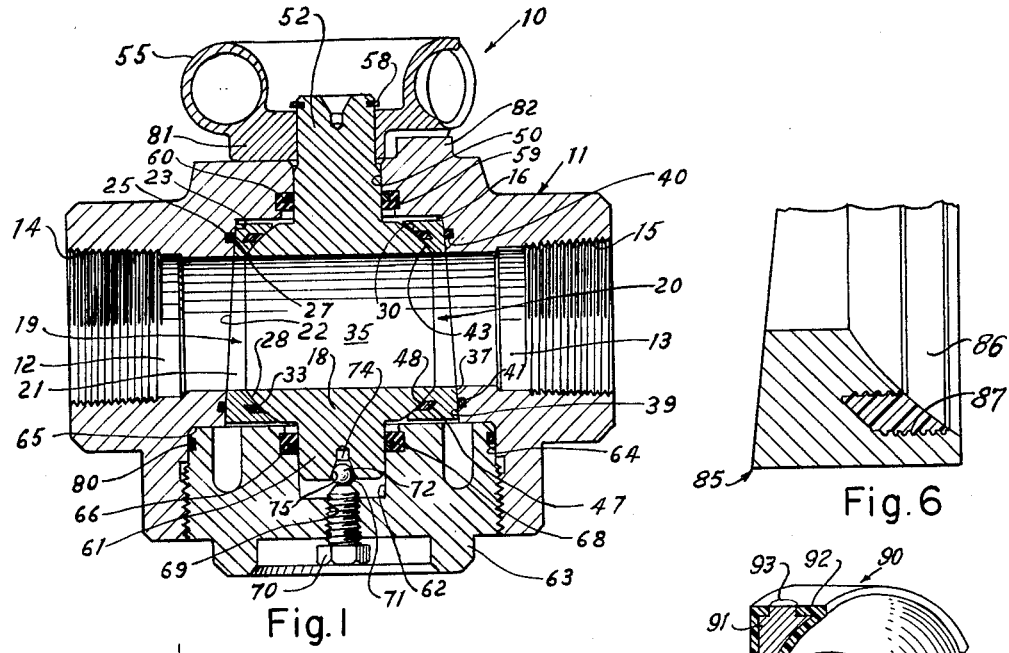
Fig. 1
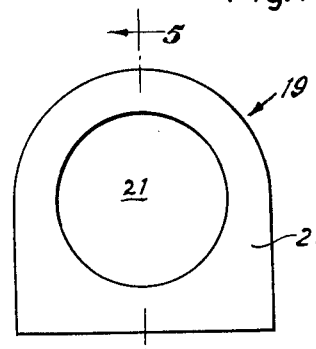
Fig. 4   Fig. 5
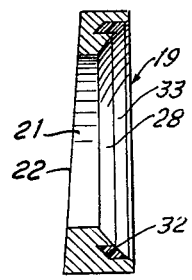
Fig. 6
Fig. 7
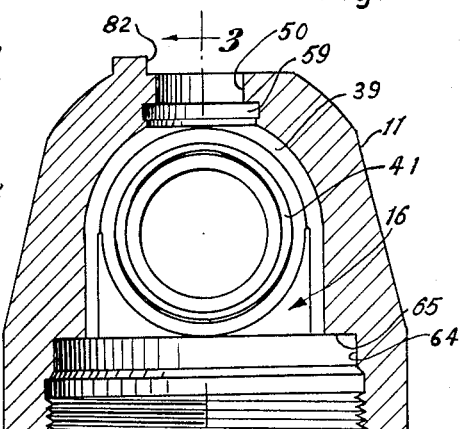
Fig. 2
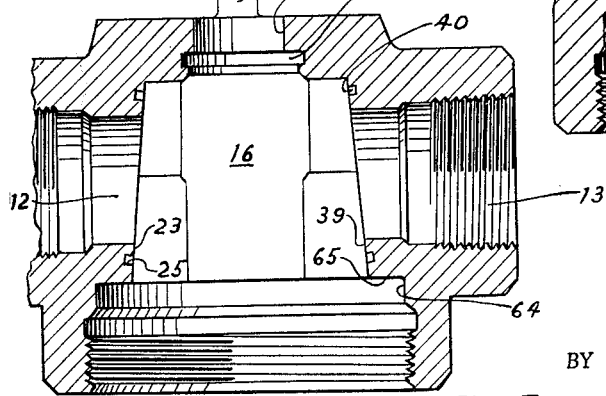
Fig 3
INVENTORS
Jack C. McGuire
Joel M. Stogner
William S. Thompson, Jr.
BY E. Hastings Ackley
and Walter J. Jagmin
ATTORNEYS 3,173,648
FLOW CONTROL DEVICES
Jack C. McGuire, Joel M. Stogner, and William S. Thompson, Jr., Duncan, Okla., assignors to Halliburton Company, Duncan, Okla., a corporation of Delaware
Filed Aug. 14, 1961, Ser. No. 131,203
5 Claims. (Cl. 251—188)

This invention relates to flow control devices and more particularly to valves.

Plug valves of the type illustrated in the patent to Stogner, 2,813,695, have a cylindrical plug and tapered cylindrical inserts which engage corresponding cylindrical tapered surfaces of a valve body in which they are disposed so that longitudinal movement of the cylindrical plug and the inserts in the valve body in such tapered bore varies the force holding the plug in intimate sealing engagement with the inserts and of the inserts with the valve body. It is found that due to the impossibility of accurately machining or forming arcuate tapered surfaces, the areas of the inserts in contact with the tapered bore surfaces of the valve are very small, thereby reducing the effectiveness of the seal effected by the intimate engagement of these surfaces and the uniformity of the forces holding the valve inserts in engagement with the plug.

Accordingly, an object of this invention is to provide a flow control device or valve having a spherical or ball valve and inserts which have arcuate surfaces for engaging the ball valve and planar surfaces which engage planar surfaces of the valve body in which the ball valve and the inserts are disposed.

Another object is to provide a valve wherein the planar surfaces of the inserts and of the valve body extend convergently so that movement of the ball valve and the inserts in the valve body in the direction of convergence of the planar surfaces moves the valve inserts and the ball valve into tighter sealing engagement with one another.

Still another object is to provide a valve having a ball valve provided with a flow passage which may be placed into and out of communication with inlet and outlet passages of the valve body in which the ball valve is inserted wherein the ball valve is mounted for limited movement in the valve body whereby the ball valve and its associated inserts may move under the force of pressure differential across the ball valve to effect a fluid-tight sealing engagement between the ball valve, the inserts and the valve body.

A further object is to provide a flow control device or valve having a ball valve and inserts in a valve body which are held therein by a removable bonnet whereby the ball valve and the inserts may be readily removed.

A still further object is to provide a valve wherein the ball valve is provided with a cylindrical shaft portion or extension, which extends into a bore of the valve bonnet whereby the position of the ball valve in the valve body may be adjusted by the adjustment of an adjusting means which includes a member or bolt carried by the bonnet which engages a ball bearing received in a tapered bore of the shaft portion of the ball valve, whereby the adjusting means permits movement of the ball valve relative to the bonnet and the valve body.

Still another object is to provide a new and improved valve insert having resilient seal means for engaging a spherical surface of a ball valve.

Another object is to provide a valve insert wherein the resilient seal element is threadedly disposed in a recess of the valve insert.

A still further object is to provide a valve insert having a core embedded in a resilient sheath, the core having means for preventing movement of the sheath relative to the core.

Additional objects and advantages of the invention will be readily apparent from the reading of the following description of a device constructed in accordance with the invention, and reference to the accompanying drawings thereto, wherein:

FIGURE 1 is a sectional view of the valve embodying the invention;

FIGURE 2 is a sectional view of the body of the valve illustrated in FIGURE 1;

FIGURE 3 is a sectional view taken on line 3—3 of FIGURE 2;

FIGURE 4 is an elevational view of one of the inserts of the valve;

FIGURE 5 is a sectional view taken on line 5—5 of FIGURE 4;

FIGURE 6 is a fragmentary sectional view of a modified form of the insert; and,

FIGURE 7 is a fragmentary perspective view of another modified form of the valve insert.

Referring now to the drawings, the valve 10 includes a body 11 having passageways 12 and 13. Fluid may flow through the valve body in either direction through passageways 12 and 13. For the purposes of description, it may be assumed that the passageway 12 is the inlet and the passageway 13 is the outlet of the valve body. The valve body may be threaded as at 14 and 15 to permit connection thereof to pipes or other suitable flow conductors or conduits. The valve body is provided with a chamber 16 which extends at right angles to and intersects the passageways 12 and 13. A ball valve 18 and inserts 19 and 20 are disposed within the chamber to control the flow of fluids between the passageways 12 and 13.

The insert 19 has a passage 21 which is coaxial with and communicates with the pasageways 12 and 13 of the body and a planar surface 22 at one side thereof which engages the planar surface 23 at one end of the chamber of the valve body. The surfaces 23 and 22 of the body and of the insert 19 are so inclined relative to the central axis of the passageways 12 and 13, respectively, as to cause the insert to move to the right, FIGURE 1, as it is moved upwardly. The valve body has an annular recess 25 extending from the beveled planar surface 23 in which is disposed an O-ring 27 or other suitable sealing means for sealing between the planar surfaces 22 and 23 of the insert and the valve body.

The valve insert 19 is provided with an arcuate annular surface 28 of substantially the same configuration as the spherical outer surface 30 of the ball valve 18 so that the ball valve 18 may rotate about an axis perpendicular to the central axis of the passageways 12 and 13 of the valve body while remaining in contact with the arcuate surface 28 of the insert 19. The insert 19 has an annular recess 32 which opens to the arcuate surface 28 thereof in which is disposed a resilient seal means 33 which engages the spherical surface of the ball valve to seal between the ball valve and the insert 19 about the passage 21 of the insert and the passage 35 of the ball valve when the ball valve is in open position.

The insert 20 is identical in configuration and dimensions to the insert 19 and has a planar surface 37 which engages the planar surface 39 of the valve body. The planar surfaces 23 and 39 of the valve body extend divergently downwardly, as seen in FIGURE 1, so that the inserts tend to move toward one another as they move upwardly in the valve body.

The valve body is provided with an annular recess 40 in which is disposed an O-ring or other suitable seal means 41 which seals between the insert 20 and the valve body. The arcuate annular surface 43 of the valve insert 20 engages the spherical surface 30 of the ball valve and is provided with an annular recess 47 in which is disposed a resilient seal means 48 which seals between the ball valve and the insert 20. The valve body has an aperture 50 which communicates with the chamber 16 and through which extends the shaft portion or cylindrical projection 52 whose outer end portion, which extends exteriorly of the valve body, is preferably of non-circular configuration. A handle 55 is slidably but non-rotatably held against outward displacement from the shaft portion by a split or lock ring 58 received in a suitable external annular recess of the shaft portion. The valve body is provided with an annular recess 59 in which is disposed a resilient seal means 60 which seals between the valve body and the handle shaft portion.

A similar shaft portion or cylindrical projection 61 of the ball valve extends diametrically oppositely from the handle shaft portion 52 into the bore 62 of a bonnet 63 threadedly secured in the enlarged bore 64 of the body which communicates with the lower end of the chamber 16 of the body and which provides an annular shoulder 65 which limits inward movement of the bonnet into the body.

The bonnet is provided with an internal annular recess 66 in which is disposed a resilient seal means 68 which seals between the bonnet and the lower shaft portion 61 of the ball valve. The upper and lower shaft portions 52 and 61 are of slightly smaller external diameter than the diameters of the apertures 50 and 62 of the valve body and of the bonnet, respectively, so that the ball valve is free to move slightly relative to the body to permit its proper alignment with the seal inserts.

The bonnet has a threaded bore 69 in which is received a bolt 70 whose flat upper end 71 engages a ball bearing 72 which is partially received within a bore 74 of the shaft portion 61, the ball bearing contacting the conical surface 75 of the bore.

It will be apparent that tightness of fit between the spherical surface of the ball valve with the inserts and between the planar surfaces at opposite ends of the chamber with the planar surfaces of the inserts, when the valve is open, will depend on the force exerted by the adjusting bolt 70 on the ball bearing since upward movement of the ball valve results in similar movement of the valve inserts which, due to the upwardly convergent inclination of the planar surfaces of the valve body and of the valve inserts, causes the valve inserts to be moved inwardly towards each other and towards the ball valve. Since these surfaces are planar, contact is maintained throughout their complete areas. The bonnet has an external annular recess in which is disposed a resilient seal element or means 80 for sealing between the bonnet and the valve body.

When the ball valve is rotated to a closed position wherein its passage is out of communication with the passages 12 and 13 of the valve body, the fluid pressure will cause the ball valve to be moved to the right, as seen in FIGURE 1, and if the passage 12 is the inlet passage, cause its spherical surface to move into intimate sealing contact with the arcuate surface 43 of the insert 20. The planar surface 37 of the insert 20 will of course be held against the planar surface 39 of the valve body having a fluid tight seal therebetween. The higher the pressure differential between the passages 12 and 13 of the valve body, the greater will be the force holding the ball valve in sealing engagement with the valve insert and the valve insert with the planar surface of the valve body. The tolerance or clearance between the cylindrical shaft portions 52 and 61 of the ball valve and the aperture 50 of the valve body and the bore 62 of the bonnet, respectively, permit such movement of the ball valve relative to the body. It will be apparent that the tightness of fit of the ball valve and of the inserts in the valve body may be readily adjusted by rotation of the adjusting bolt, that the provision of the ball bearing between the adjusting bolt and the ball valve shaft portion permits a limited degree of movement of the ball valve relative to the adjusting bolt and that the looseness of the fit of the cylindrical or shaft portions of the ball valve with the valve body further permits accommodation or adjustment of the ball valve under fluid pressures to effect an efficient seal even when the valve is closed and a maximum pressure differential is exerted thereacross.

The abutting wedging or camming surfaces of the inserts and the valve body provide large areas of contact between the inserts and the valve body so that the force holding the spherical surface of the ball valve in sealing engagement with the arcuate surfaces of the valve inserts is uniformly applied to the valve inserts and thus provides an efficient sealing contact therebetween. The flat or planar camming or wedging surfaces are easily produced to the tolerances required and simplify the provision of an effective seal between the inserts and the valve body.

If desired, the handle and the valve may be provided with a lug or stop, 81 and 82, respectively, which limit rotation of the ball valve within predetermined limits, such as ninety degrees between a fully open and a fully closed position.

In FIGURE 6 is illustrated a modified insert 85 in which the annular recess 87 thereof instead of merely inserted therein, as in the sealing elements of the valve inserts 19 and 20.

In FIGURE 7 is illustrated a modified insert 90 which may be used in place of the valve inserts illustrated in FIGURE 1 wherein the valve insert has an annular core 91 of a suitable metal which is embedded or encased in a resilient sheath 92 which may be molded thereabout. The annular core 91 is provided with peripheral radially outwardly extending projections 93 which extend into or through the resilient sheath 92 to limit or prevent movement therebetween. While the different forms of the inserts have been shown as provided with resilient seal elements or means, it will be apparent that the inserts could be of one piece construction formed of a suitable metal without any additional seal elements or means, the sealing between the ball valve and the inserts then being a metal to metal seal.

It will be apparent that if the inserts 90 are employed, the valve body need not be provided with annular recesses in its planar surfaces and with the seal elements which are otherwise disposed therein.

It will also be seen that the inserts are substantially wedge shaped with their narrow ends remote from the bonnet.

It will now be seen that a new and improved flow control device or valve has been illustrated and described which includes a valve body having inlet and outlet passages and a chamber transversely disposed with respect to the passages, the body having planar surfaces defining opposite ends of said chamber which extend about the passages and convergently from a threaded aperture of the body which receive a bonnet.

It will further be seen that the bonnet retains a ball valve and a pair of inserts in the chamber, the inserts having passages which communicate with the inlet and outlet passages of the valve body and the ball valve having a passage which is adapted to communicate with the passages of the inserts and the valve body when the ball valve is rotated to an open position and which is adapted to be out of communication with these passages when the ball valve is rotated to a closed position.

It will further be seen that the valve inserts have planar surfaces which engage the planar surfaces of the valve body and arcuate surfaces which engage the ball valve.

It will further be seen that the ball valve has diametrically oppositely extending shaft portions, one of which extends outwardly of the valve body from the chamber through an aperture thereabove and is provided with means for rotating the ball valve and the other shaft portion which extends into a bore of the bonnet.

It will further be seen that the position of the ball valve in the chamber may be adjusted by an adjusting means which causes movement of the shaft portion, which is in the bore of the bonnet, and the ball valve relative to the bonnet.

It will further be seen that the adjusting means includes a threaded member or bolt which extends through a bore in the bonnet and a ball bearing which bears against the bolt and which is partially received in a conical bore or recess of the shaft portion of the ball valve which is received in the bore of the bonnet.

It will further be seen that new and improved valve inserts have been illustrated and described which have arcuate surfaces for engaging a spherical surface of a ball valve and have annular recesses, which open outwardly of the arcuate surfaces, in which are received resilient seal elements for engaging the spherical surface of a ball valve.

It will further be seen that the seal elements of the valve inserts may be threaded in the annular recesses thereof.

It will further be seen that the valve inserts may include a hard core of metal, or the like, which is covered by a sheath of resilient sealing substance and that the core is provided with means for preventing movement of the sheath relative to the core.

The foregoing description of the invention is explanatory only, and changes in the details of construction illustrated may be made by those skilled in the art, within the scope of the appended claims, without departing from the spirit of the invention.

What is claimed and desired to be secured by Letters Patent is:

1. A valve including: a valve body having inlet and outlet passages and a chamber transversely disposed with respect to and between said passages, said body having planar surfaces which extend transversely to and about said passages and define opposite ends of said chamber, said planar surfaces extending convergently relative to each other; a pair of inserts disposed in said chamber having planar surfaces engageable with said planar surfaces of said valve body and having annular arcuate surfaces spaced from and opposite the planar surfaces, said annular surface of each of said inserts being disposed to face the annular arcuate surface of the other insert in said chamber; a ball valve disposed in said chamber between said inserts and having a spherical surface engageable with said arcuate surfaces of said inserts, said inserts having passages communicating at one end with the inlet and outlet passages of said valve body and at the opposite end opening to the exterior of the insert within the annular arcuate surface, said ball balve having a passage therein adapted to be selectively registered with said passages of said inserts upon rotation of said ball valve, said ball valve, having a supporting shaft portion extending outwardly therefrom, said body having an aperture communicating with said chamber; closure means releasably secured in said aperture and having supporting means engaging said supporting shaft portion for adjustably moving said ball valve and said inserts in said chamber in the direction of convergence of said planar surfaces of said body, whereby the camming action between the planar surfaces of the inserts and of the said valve body causes said valve inserts and said ball valve to move into sealing engagement with one another and causes the planar surfaces of said valve inserts to move into sealing contact with said planar surfaces of said valve body, said supporting means including a member movably mounted in said closure means and a spherical bearing member engageable therewith, said supporting shaft portion of said ball valve having a recess defined by a conical surface, said spherical bearing member being partially disposed in said recess and engaging said conical surface whereby said supporting means supports said ball valve and said valve inserts in said housing against displacement from operating position therein by pressure of fluid within the housing.

2. A valve including: a valve body having inlet and outlet passages and a chamber transversely disposed with respect to and between said passages, said body having planar surfaces which extend transversely to and about said passages and define opposite ends of said chamber, said planar surfaces extending convergently relative to each other; a pair of inserts disposed in said chamber having planar surfaces engageable with said planar surfaces of said valve body and having annular arcuate surfaces thereon opposite said planar surfaces, said arcuate surface of each of said inserts facing the arcuate surface of the other insert in said chamber; a ball valve disposed in said chamber between said inserts and having a spherical surface engageable with said arcuate surfaces of said inserts, said inserts having annular seal means extending from said arcuate surfaces for engaging said ball valve, said inserts having passages communicating at one end of each of said passages with the inlet and outlet passages of said valve body, the opposite end of said passages being disposed within the annular arcuate surface on the opposite side of said insert; said ball valve having an imperforate portion and a passage therein adapted to be selectively registered with said passages of said inserts upon rotation of said ball valve, said body having an aperture communicating with the chamber of said body adjacent the divergent end portions of said planar surfaces of said body; said ball valve having shaft portions extending diametrically outwardly from opposite sides thereof, one of said shaft portions forming a handle portion and extending outwardly through an opening in said body axially of the convergent ends of the planar surfaces in said body and the other of said shaft portions being disposed in said aperture formed in said body communicating with said chamber and forming a supporting shaft portion for said ball valve opposite said handle portion; closure means releasably secured in said aperture and having supporting means engaging said supporting shaft portion of said ball valve opposite said handle portion for adjustably supporting said ball valve in operating position within said valve chamber and for adjustably moving said ball valve and said valve inserts in said chamber in the direction of convergence of said planar surfaces of said body, whereby the camming action between the planar surfaces of the inserts and of the valve body causes the valve inserts and the ball valve to move into sealing engagement with one another and causes the planar surfaces of said valve inserts to move into sealing contact with said planar surfaces of said valve body; said divergent end portions of said valve inserts being exposed to fluid pressure within the valve body passages to be biased outwardly of said passages by such pressure in the direction of divergence of said planar surfaces, said supporting means on said closure member engaging said supporting shaft portion of said ball valve to prevent movement of said ball valve and said valve seats in engagement therewith from operative position in said housing by fluid pressure therewithin.

3. A valve including: a valve body having axially aligned inlet and outlet passages and a chamber transversely disposed with respect to and between said passages, said body having internal surfaces which extend convergently relative to each other and transversely to and about said passages and defining opposite ends of said chamber; a pair of inserts disposed in said chamber having convergently extending surfaces conforming to and disposed in engagement with said convergently extending surfaces of said valve body, each said insert having an annular arcuate surface opposite said planar surface and facing the arcuate surface of the opposite insert in said chamber; a ball valve disposed in said chamber between said inserts and having a spherical surface engageable with said arcuate surfaces of said inserts, said inserts having passages communication at one end thereof with the inlet and outlet passages of said valve body and opening at their opposite ends outwardly of said insert within the annular arcuate surface on the surface opposite said planar surface of said insert, said ball valve having an imperforate portion and a passage therein extending transversely of said ball valve and adapted to be selectively registered with said passages of said inserts upon rotation of said ball valve, said ball valve having a shaft portion extending outwardly therefrom on diametrically opposite sides of said ball valve perpendicularly to the transverse passage through said ball valve, one of said shaft portions comprising an operating handle, said body having an aperture communicating with said chamber; the other of said shaft portions projecting from said ball valve comprising a supporting shaft section disposed axially in said aperture at the divergent ends of the planar surfaces in said body; closure means releasably secured in said aperture and having ball anti-friction supporting means engaging said supporting shaft portion of said ball valve opposite said handle portion for adjustably supporting said ball valve and said seats in operative position in the chamber of said valve body against displacement therefrom by fluid pressure within said chamber, said supporting means also being adjustable for moving said ball valve and said inserts in said chamber in the direction of convergence of said convergently extending surfaces of said body whereby the camming action between the convergently extending surfaces of the inserts and of the said valve body causes said valve inserts and said ball valve to move into sealing engagement with one another and causes the planar surfaces of said valve inserts to move into sealing contact with said planar surfaces of said valve body in said chamber.

4. A valve including: a valve body having a chamber therein and axially aligned inlet and outlet passages disposed transversely with respect to said chamber, said body having convergent planar surfaces extending transversely of said passages and defining opposite ends of said chamber with respect to said passages; a pair of inserts disposed in said chamber, each of said inserts having a planar surface conforming to and disposed in engagement with one of the planar surfaces of said valve body in said chamber of said valve body and having an annular spherical surface disposed on the side of said insert opposite said planar surface, said inserts having a flow passage therethrough communicating at one end with the adjacent inlet or outlet passage and at its other end opening outwardly within the annular concave spherical surface on the opposite side of said insert, said annular concave spherical surface of each of said inserts facing inwardly toward and being spaced from the concave spherical surface of the opposite insert; a spherical ball valve member disposed in said chamber between said inserts and having a spherical surface engageable with the annular spherical surfaces of said inserts in sealing engagement therewith, said ball valve having a pair of diametrically opposed shaft portions extending outwardly therefrom providing means for rotatably supporting said ball valve in said body, one of said shaft portions extending outwardly from said valve body and providing means for mounting an operating handle thereon; said ball valve having an imperforate portion and a transverse passage therethrough extending perpendicularly to the axis of said shaft portions and adapted to be selectively registered with said passages of said inserts upon rotation of said ball valve about the axis of said shaft portions, said valve body having an aperture communicating with said chamber axially of the divergent end portions of said planar surfaces of said body, said shaft portion of said ball valve opposite the handle shaft portion comprising a supporting shaft portion, said aperture being adapted to receive said supporting shaft portion opposite the handle shaft portion; closure means releasably secured in said aperture of said body; means movably mounted in said closure means and having means engageable with said support shaft portion of said ball valve for adjustably moving said ball valve transversely of the flow passages in said chamber in the direction of the convergence of said planar surfaces in said chamber of said body, whereby movement of said ball valve moves said inserts therewith, the camming action between the convergent planar surfaces of the chamber of the valve body and said inserts moving said inserts into close sealing engagement with said ball valve and into closer sealing engagement with the convergent planar surfaces of the valve body, said support means on said closure member and said support shaft portion of said ball valve preventing displacement of said ball valve and said valve inserts from operative position within said valve body by the pressure of fluids within said valve body.

5. A valve of the character set forth in claim 4 and including anti-friction means between said supporting shaft portion of said valve opposite the handle portion and said support means of said means movable in said closure means of said valve body, whereby said ball valve may be rotated freely in said body.

References Cited in the file of this patent

UNITED STATES PATENTS

| | | |
|---|---|---|
| 1,941,839 | Johansson | Jan. 2, 1934 |
| 2,564,168 | Meador | Aug. 14, 1951 |
| 2,585,658 | Keller | Feb. 12, 1952 |
| 2,639,883 | Smith | May 26, 1953 |
| 2,700,528 | Blackman | Jan. 25, 1955 |
| 3,014,690 | Boteler | Dec. 26, 1961 |
| 3,058,484 | Feiring | Oct. 16, 1962 |
| 3,081,792 | Hansen | Mar. 19, 1963 |

FOREIGN PATENTS

| | | |
|---|---|---|
| 403,389 | Great Britain | Dec. 18, 1933 |
| 1,102,510 | Germany | Mar. 16, 1961 |
| 1,263,006 | France | Apr. 24, 1961 |

UNITED STATES PATENT OFFICE
CERTIFICATE OF CORRECTION

Patent No. 3,173,648            March 16, 1965

Jack C. McGuire et al.

It is hereby certified that error appears in the above numbered patent requiring correction and that the said Letters Patent should read as corrected below.

Column 4, line 24, after "annular" insert -- sealing element 86 is threaded in the annular --; column 5, line 52, for "balve" read -- valve --; column 6, line 74, for "communication" read -- communicating --.

Signed and sealed this 17th day of August 1965.

(SEAL)
Attest:

ERNEST W. SWIDER            EDWARD J. BRENNER
Attesting Officer            Commissioner of Patents